US008897242B2

(12) United States Patent
Cheng et al.

(10) Patent No.: US 8,897,242 B2
(45) Date of Patent: Nov. 25, 2014

(54) METHOD AND SYSTEM FOR CONFIGURING ENHANCED DEDICATED CHANNEL TRANSMISSION BEARER MODE

(75) Inventors: Xiang Cheng, Shenzhen (CN); Lin Liu, Shenzhen (CN); Yazhu Ke, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 188 days.

(21) Appl. No.: 13/521,018

(22) PCT Filed: Jul. 22, 2010

(86) PCT No.: PCT/CN2010/075401
§ 371 (c)(1),
(2), (4) Date: Jul. 6, 2012

(87) PCT Pub. No.: WO2011/082579
PCT Pub. Date: Jul. 14, 2011

(65) Prior Publication Data
US 2013/0128827 A1 May 23, 2013

(30) Foreign Application Priority Data
Jan. 11, 2010 (CN) .......................... 2010 1 0004555

(51) Int. Cl.
*H04W 4/00* (2009.01)
*H04W 24/02* (2009.01)
*H04W 72/04* (2009.01)
H04W 88/12 (2009.01)
H04W 72/00 (2009.01)
H04W 88/08 (2009.01)

(52) U.S. Cl.
CPC .............. *H04W 72/04* (2013.01); *H04W 88/12* (2013.01); *H04W 24/02* (2013.01); *H04W 72/00* (2013.01); *H04W 88/08* (2013.01)
USPC ............ 370/329; 370/252; 370/254; 370/328

(58) Field of Classification Search
CPC . H04W 72/04; H04W 72/041; H04W 76/025; H04W 72/0413; H04L 29/06088
See application file for complete search history.

(56) References Cited

U.S. PATENT DOCUMENTS

| 2005/0265301 A1 | 12/2005 | Heo et al. |
| 2006/0039326 A1* | 2/2006 | Jeong et al. ................... 370/329 |
| 2008/0259863 A1 | 10/2008 | Zhang et al. |

FOREIGN PATENT DOCUMENTS

| CN | 1968066 A | 5/2007 |
| CN | 101019344 A | 8/2007 |
| CN | 101426254 A | 5/2009 |
| CN | 101483890 A | 7/2009 |
| CN | 101562884 A | 10/2009 |

OTHER PUBLICATIONS

ETSI TS 125 427 V8.1.0, Universal Mobile Telecommunications System (UMTS); UTRAN Iur/Iub interface user plane protocol for DCH data streams (3GPP TS 25.427 version 8.1.0 Release 8), Jan. 2009.*

(Continued)

*Primary Examiner* — Kibrom T Hailu
*Assistant Examiner* — James P Duffy
(74) *Attorney, Agent, or Firm* — Moore & Van Allen PLLC; Henry B. Ward, III

(57) ABSTRACT

A method and a system for configuring an enhanced dedicated channel transmission bearer mode are provided by the present invention. The method comprises: in a situation that a first radio network controller (RNC) establishes an enhanced dedicated channel cell over a non-main carrier frequency layer in a predetermined network element, the first RNC configuring an enhanced dedicated channel transmission bearer mode of the predetermined network element, wherein the predetermined network element comprises at least one of the following: a node B connected to the first RNC and a second RNC connected to the first RNC. The present solution solves the problem in the related art that: the radio network controller cannot distinguish the received data from a main carrier and the received data from an auxiliary carrier.

14 Claims, 11 Drawing Sheets

(56) References Cited

OTHER PUBLICATIONS

International Search Report; Nov. 4, 2010; issued in International Patent Application No. PCT/CN2010/075401.

"Change Request, Introduction of Dual-Cell HSUPA", Nokia Siemens Networks; 3GPP TSG-RAN3 Meeting #65bis; Miyazaki, Japan, Oct. 12-15, 2009; R3-092598; 10 pages.

SIPO (State Intellectual Property Office of the P.R.C.) Examination Report of Chinese Priority Application No. 201010004555.5; dated May 12, 2014; 6 pages.

* cited by examiner

METHOD AND SYSTEM FOR CONFIGURING ENHANCED DEDICATED CHANNEL TRANSMISSION BEARER MODE

FIELD OF THE INVENTION

The present invention relates to communication field, and in particular to a method and a system for configuring an enhanced dedicated channel transmission bearer mode.

BACKGROUND OF THE INVENTION

The object of high speed uplink packet access technology is to improve the capacity and the data throughput in the uplink direction and to reduce the delay in the dedicated channels. The high speed uplink packet access technology introduces a new transmission channel: an enhanced dedicated channel, which improves the implementation of the physical layer and the media access control layer, and the uplink data rate can reach up to 5.6 MBPS theoretically. The high speed uplink packet access technology retains the characteristics of soft handover, a media access control protocol data unit received by an air interface is de-multiplexed into media access control streams and transmitted to a target radio network controller through transmission bearers corresponding to the media access control streams (each media access control stream has a corresponding IUB interface and/or IUR interface transmission bearer) via an Interconnection of type B (referred to as IUB) interface from a node B or an Interconnection interface between radio network controllers (referred to as IUR) from a radio network controller by means of uplink enhanced dedicated channel data frames.

With the development of the technology, the dual carrier high speed uplink packet access technology is expected to be introduced to the existing system, which enables terminals to send data on two carriers with high speed uplink packet access technology, and thereby the rate of uplink data is multiplied. The carrier which comprises a high speed dedicated physical control channel in the dual carrier is referred to as main carrier, while the other carrier is referred to as auxiliary carrier. As to one terminal, each carrier in the dual carrier has its own independent enhanced dedicated channel activation set. BY the introduction of dual carrier high speed uplink packet access technology, it is required to consider the extendibility of the subsequent multi-carrier (such as three-carrier and four-carrier). The carrier which comprises a high speed dedicated physical control channel in the multi-carrier is referred to as main carrier, and other carriers are respectively referred to as second carrier, third carrier, and fourth carrier.

FIG. 1 shows a typical scenario of dual carrier high speed uplink packet access technology, and as shown in FIG. 1, a terminal uses the dual carrier high speed uplink packet access technology to send data over the main carrier and the auxiliary carrier simultaneously. The main carrier has its own enhanced dedicated channel activation set, which contains a cell 1 under a node B1 and a cell 3 under a node B2. The auxiliary carrier has its own enhanced dedicated channel activation set, which contains a cell 2 under the node B1 and a cell 4 under a node B3.

The terminal sends uplink data to the network side via the main carrier, and on the network side, the transmission path of the uplink data is:

(cell 1) from the node B1 to a radio network controller 1; and (cell 3) from the node B2 to a radio network controller 1.

The terminal sends uplink data to the network side via the auxiliary carrier, and on the network side, the transmission path of the uplink data is:

(cell 2) from the node B1 to the radio network controller 1; and (cell 4) from the node B3 to the radio network controller 2 and then to the radio network controller 1.

In the relevant dual carrier high speed uplink packet access technology, the enhanced dedicated channel transmission bearer mode is defined to comprise a "share mode" or a "separate mode". Wherein, the "share mode" refers to send the same media access control (referred to as MAC) stream received by all the uplink carriers in the multi-carrier on a transmission bearer; and the "separate mode" refers to send each MAC stream received by each different uplink carrier in the multi-carrier on a transmission bearer. When the transmission bearer mode of the enhanced dedicated channel is the "share mode", in order to distinguish the MAC streams on the same transmission bearer received from different carriers, the "uplink multiplexing information" in an uplink enhanced dedicated channel data frame is defined, which is used for indicating the identifier of the carrier from which the data frame is received, such as the main carrier or the auxiliary carrier; and when the transmission bearer mode of the enhanced dedicated channel is the "separate mode", the "uplink multiplexing information" can be empty or the "uplink multiplexing information" can be neglected by a receiver.

Under the "share mode", on a selected transmission bearer, the particular mode of transmitting an enhanced dedicated channel data frame which carries the uplink multiplexing information is as shown in FIG. 2. The node B1 receives the same MAC stream-1s from both the main carrier and the auxiliary carrier, and sends the same MAC stream-1s to the radio network controller 1 by carrying them on the same transmission bearer-1. In the 2 uplink enhanced dedicated channel data frames shown in the figure, the "uplink multiplexing information" is respectively filled with main or auxiliary to indicate the carrier from which this data frame is received is the main carrier or the auxiliary carrier. Likewise, as to the radio network controller 2, it receives an uplink enhanced dedicated channel data frame from the node B3 and forwards the frame to the radio network controller 1; and the uplink enhanced dedicated channel data frame is transferred on the transmission bearer-2 and transmission bearer-3, and the uplink multiplexing in the uplink enhanced dedicated channel data frame is set as main so as to indicate that the carrier from which this data frame is received is the main carrier.

Under the "separate mode", on a selected transmission bearer, the particular mode of transmitting an enhanced dedicated channel data frame which carries the uplink multiplexing information is as shown in FIG. 3. The IUB interface connecting the node B1 and the radio network controller 1 has 2 different transmission bearers, wherein the transmission bearer-1 is dedicated to bear the data received from the main carrier, and the transmission bearer-4 is dedicated to bear the data received from the auxiliary carrier. The node B1 sends the uplink enhanced dedicated channel data frame of the data received from the main carrier on the transmission bearer-1, and sends the uplink enhanced dedicated channel data frame of the data received from the auxiliary carrier on the transmission bearer-4. Since the data received from the main/auxiliary carrier can be distinguished by the transmission bearers, the "uplink multiplexing information" in the uplink enhanced dedicated channel data frame is empty, or the "uplink multiplexing information" is neglected by the receiver. Likewise, as to the radio network controller 2, it receives an uplink enhanced dedicated channel data frame from the node B3 and forwards the frame to the radio network controller 1; and the uplink enhanced dedicated channel data frame of the data received from the main carrier is transferred on the transmission bearer-2 and transmission bearer-3 which are dedicated to bear the data received from the main carrier, and the uplink multiplexing information in the uplink enhanced dedicated channel data frame is set as empty or the "uplink multiplexing information" is neglected by the receiver.

As to the radio network controller 1, it accumulates the uplink data from all the transmission paths. The received data from the main carrier and the received data from the auxiliary carrier can be distinguished through the uplink multiplexing information in the uplink enhanced dedicated channel data frame under the "share mode" or the separated transmission bearer under the "separate mode", and reordering and macro diversity combining can be carried out respectively on the basis of single carrier. Once the received data from different carriers are mixed up, the reordering and macro diversity combining cannot be carried out normally, which causes all the data wrong and the actual services unavailable. Finally, the network drops.

In the related art, the enhanced dedicated channel transmission bearer mode information is configured for the node B or another radio network controller via an IUB interface or an IUR interface by a radio network controller, for example, in FIG. 1, the transmission bearer mode information is configured for the node B1, the node B2 and the radio network controller 2 via the IUB interface or the IUR interface by the radio network controller 1, and the transmission bearer mode information is configured for the node B3 via the IUB interface by the radio network controller 2.

In the related art, as to the node B and/or the radio network controller which only have the main carrier enhanced dedicated channel cell (such as the node B2 in FIG. 1), and the node B and/or the radio network controller which only have a auxiliary carrier enhanced dedicated channel cell (such as the node B3 and the radio network controller 2 in FIG. 1), their enhanced dedicated channel transmission bearer mode information will not be set. Subsequently, these nodes B and/or these radio network controllers transmit the uplink enhanced dedicated channel data frame by means of single carrier, i.e. the same MAC stream is selected and carried on the same transmission bearer for sending, the uplink multiplexing information in the uplink enhanced dedicated channel data frame is set as empty or the uplink multiplexing information in the uplink enhanced dedicated channel data frame is neglected by the receiver, and the uplink enhanced dedicated channel data frame is transmitted to the receiver.

However, the inventors have found that during implementation of the above method for configuring enhanced dedicated channel transmission bearer mode information there are problems as follows: when the "uplink multiplexing information" in the uplink enhanced dedicated channel data frame is set as main carrier, the corresponding coded value is 0. When the "uplink multiplexing information" in the uplink enhanced dedicated channel data frame is set as empty, the corresponding coded value is also 0. This means that all the coded values of the "uplink multiplexing information" in the uplink enhanced dedicated channel data frame of the data from the main carrier under the share mode, all the data under the separate mode, and all the data of the single carrier are 0. As to the radio network controller of the accumulation party (such as the radio network controller 1 shown in FIG. 1), the three situations cannot be distinguished, and only unified treatment will be performed according to currently recorded "enhanced dedicated channel transmission bearer mode information" configuration information. Then, under the scenario shown in FIG. 4 (the difference from the typical scenario in FIG. 1 lies in that the cell 3 under the node B2 is a macro diversity cell over the auxiliary carrier frequency layer), according to the configuration mode in the related art, during the transmission process of the corresponding enhanced dedicated channel data frames, the enhanced dedicated channel transmission bearer mode of the node B1 configured by the radio network controller 1 is "share mode", and any enhanced dedicated channel transmission bearer mode of the node B2 and the radio network controller 2 is not configured by the radio network controller 1. Then the situation shown in FIG. 5 will occur as follows.

The node B1 receives the same MAC stream-1s from both the main carrier and the auxiliary carrier, and sends them to the radio network controller 1 over the same transmission bearer-1. In the 2 uplink enhanced dedicated channel data frames shown in the figure, the "uplink multiplexing information" is respectively filled with main or auxiliary to indicate the identifier of the carrier from which this data frame is received is the main carrier or the auxiliary carrier. The uplink enhanced dedicated channel data frames are transmitted to the radio network controller 1.

The node B2, the radio network controller 2, and the node B3 managed by the radio network controller 2 transmit the uplink enhanced dedicated channel data frames in the mode of single carrier. That is to say, the same MAC stream is selected and sent on the same transmission bearer, the uplink multiplexing information in the uplink enhanced dedicated channel data frames is set as empty, or the uplink multiplexing information in the uplink enhanced dedicated channel data frames is neglected by the receiver, and the uplink enhanced dedicated channel data frames are transmitted to the radio network controller 1.

As to the radio network controller 1, it accumulates the uplink data from all the transmission paths. The radio network controller 1 deals with the data uniformly according to currently recorded "enhanced dedicated channel transmission bearer mode" configuration information, i.e. "share mode" information. The radio network controller 1 will wrongly identify the original meaning ("single carrier and the encoding is 0") of the "uplink multiplexing information" in the uplink enhanced dedicated channel data frames transmitted in the mode of single carrier sent from the node B2 and radio network controller 2 as the meaning of "main carrier" also with the encoding of 0. The radio network controller 1 will wrongly identify the uplink enhanced dedicated channel data frames sent from the node B2 and the radio network controller 2, whose real air interfaces are from the auxiliary carrier, as the uplink enhanced dedicated channel data frames whose air interfaces are from the main carrier, and the uplink enhanced dedicated channel data frames whose the real air interfaces are from the auxiliary carrier are mixed up with the uplink enhanced dedicated channel data frames sent from the node B1, whose real air interfaces are from the main carrier. Once the received data from different carriers are mixed up, reordering and macro diversity combining cannot be carried out normally, which will cause all the data to be wrong and the real services unavailable. Finally, the network drops.

Under the scenario shown in FIG. 6 (the difference from the typical scenario in FIG. 1 lies in that the node B2 belongs to the radio network controller 2), the enhanced dedicated channel data frame is transmitted according to the configuration mode in the related art, in which the radio network controller 1 configures the enhanced dedicated channel transmission bearer mode of the node B1 and the radio network controller 2 as "share mode", and the radio network controller 2 does not configure any enhanced dedicated channel transmission bearer mode for the node B2 and the node B3, and the situation shown in FIG. 7 will occur as follows.

The node B1 receives the same MAC stream-1s from two carriers of main carrier and auxiliary carrier and sends them to the radio network controller 1 over the same transmission bearer-1. In the 2 uplink enhanced dedicated channel data frames shown in the figure, the "uplink multiplexing information" is respectively filled with main or auxiliary to indicate the identifier of the carrier from which this data frame is received is the main carrier or the auxiliary carrier. The uplink enhanced dedicated channel data frames are transmitted to the radio network controller 1.

The node B2 and the node B3 transmit the uplink enhanced dedicated channel data frames in the mode of single carrier. That is to say, the same MAC stream is selected and sent on the same transmission bearer, the uplink multiplexing information in the uplink enhanced dedicated channel data frames is set as empty, or the uplink multiplexing information in the uplink enhanced dedicated channel data frames is neglected by the receiver, and the uplink enhanced dedicated channel data frames are transmitted to the radio network controller 2.

The radio network controller 2 plays the role of a drift radio network controller and can only transparently forward the uplink enhanced dedicated channel data frames received by the nodes B2 and B3 to the radio network controller 1. The radio network controller 2 is unable to make any modification on the contents of the uplink enhanced dedicated channel data frames received by the nodes B2 and B3.

Accordingly, the "uplink multiplexing information" in the uplink enhanced dedicated channel data frames which are transmitted over the IUR interface is empty and the encoding is 0.

As to the radio network controller 1, it accumulates the uplink data from all the transmission paths. The radio network controller 1 deals with the data uniformly according to currently recorded "enhanced dedicated channel transmission bearer mode" configuration information, i.e. the "share mode" information. The radio network controller 1 will wrongly identify the original meaning ("single carrier and the encoding is 0") of the "uplink multiplexing information" in the uplink enhanced dedicated channel data frames transmitted in the mode of single carrier sent and radio network controller 2 as the meaning of "main carrier" also with the encoding of 0. That is to say, the radio network controller 1 will wrongly identify all the uplink enhanced dedicated channel data frames sent from the radio network controller 2, whose real air interfaces are from the main carrier (the node B2) and the auxiliary carrier (the node B3), as the uplink enhanced dedicated channel data frames whose air interfaces are from the main carrier, and the uplink enhanced dedicated channel data frames whose real air interfaces are from the main carrier (the node B2) and the auxiliary carrier (the node B3) are mixed up with the uplink enhanced dedicated channel data frames sent from the node B1, whose real air interfaces are from the main carrier. Once the received data from different carriers are mixed up, reordering and macro diversity combining cannot be carried out normally, which will cause all the data to be wrong and the real services unavailable. Finally, the network drops.

Therefore, in the related art, according to this configuration mode, all possible scenarios are not taken into account carefully. The problem that the received data from different carriers are mixed up occurs, and the radio network controller is unable to distinguish whether the received data are from the main carrier or from the auxiliary carrier, so reordering and macro diversity combining cannot be carried out normally, which will cause the actual services unavailable. Finally the network drops.

SUMMARY OF THE INVENTION

By the present invention, a method and a system for configuring an enhanced dedicated channel transmission bearer mode are provided to solve at least one of the above problems.

According to one aspect of the present invention, a method for configuring an enhanced dedicated channel transmission bearer mode is provided, comprising the steps of: in a situation that a first RNC establishes an enhanced dedicated channel cell over a non-main carrier frequency layer in a predetermined network element, the first RNC configuring an enhanced dedicated channel transmission bearer mode of the predetermined network element, wherein the predetermined network element comprises at least one of the following: a node B connected to the first RNC and a second RNC connected to the first RNC.

According to another aspect of the present invention, a system for configuring an enhanced dedicated channel transmission bearer mode is provided, comprising: a first RNC and a predetermined network element, wherein the first RNC is configured to establish an enhanced dedicated channel cell over a non-main carrier frequency layer in a predetermined network element and configure an enhanced dedicated channel transmission bearer mode of the predetermined network element, wherein the predetermined network element comprises at least one of the following: a node B connected to the first RNC and a second RNC connected to the first RNC.

By the present invention, the first RNC configures the enhanced dedicated channel transmission bearer mode of the predetermined network element in the situation that the first RNC establishes the enhanced dedicated channel cell over the non-main carrier frequency layer in the predetermined network element, which solves the problem that in the related art the radio network controller is unable to distinguish the received data from a main carrier and the received data from a auxiliary carrier, thus causing that reordering and macro diversity combining cannot be carried out normally, and thereby the normal sending of the actual service data of the terminals is ensured.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

The present invention will be described hereinafter in detail with reference to the accompanying drawings and in conjunction with embodiments. It needs to be noted that the embodiments of the present application and the features of the embodiments can be combined with each other if there is no conflict.

Embodiment I

This embodiment provides a method for configuring an enhanced dedicated channel transmission bearer mode, wherein the method comprises the steps as follows: in a situation that a first RNC establishes an enhanced dedicated channel cell over a non-main carrier frequency layer in a predetermined network element, the first RNC configuring an enhanced dedicated channel transmission bearer mode of the predetermined network element, wherein the predetermined network element comprises at least one of the following: a node B connected to the first RNC and a second RNC connected to the first RNC.

In the related art, the RNC does not configure the enhanced dedicated channel transmission bearer mode information for nodes B and/or radio network controllers which only have main carrier or auxiliary carrier enhanced dedicated channel cells, and these nodes B and/or radio network controllers will transmit the uplink enhanced dedicated channel data frames in the mode of single carrier, which will cause the problem that the reordering and macro diversity combining cannot be carried out normally. Different from the related art, the method provided by this embodiment is for those designated terminals which use the multi-carrier high speed uplink packet access technology. When the radio network controller only establishes the enhanced dedicated channel cell over the non-main carrier frequency layer, the enhanced dedicated channel transmission bearer mode information is set, and subsequent predetermined network elements can just set the uplink multiplexing information and send data frames in accordance with the processing method in the related art according to the configured enhanced dedicated channel transmission bearer mode, which solves the problem that the received data from different carriers are mixed up, thus causing the actual services unavailable and currently available dual carrier high speed uplink packet access technology unavailable.

Figure 8:
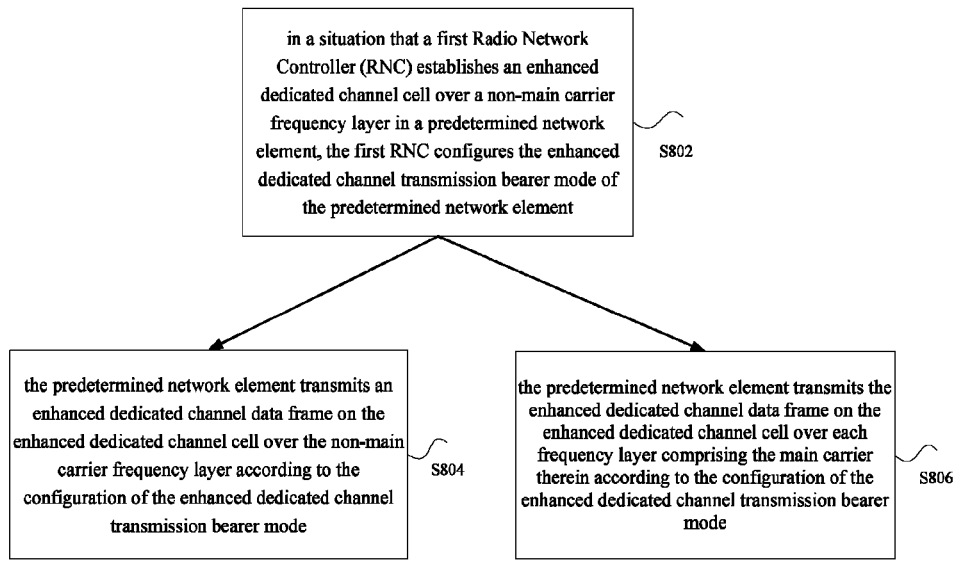
FIG. 8 is a detailed flowchart of a method for configuring an enhanced dedicated channel transmission bearer mode according to Embodiment I of the present invention.

FIG. 8 is a detailed flowchart of a method for configuring an enhanced dedicated channel transmission bearer mode according to Embodiment I of the present invention, and as shown in FIG. 8, the method particularly comprises the steps as follows.

Step S802: in a situation that a first RNC establishes an enhanced dedicated channel cell over a non-main carrier frequency layer in a predetermined network element, the first RNC configures the enhanced dedicated channel transmission bearer mode of the predetermined network element, wherein the predetermined network element comprises at least one of the following: a node B connected to the first RNC and a second RNC connected to the first RNC.

In the above, the enhanced dedicated channel cell over the non-main carrier frequency layer refers to the cell which uses the enhanced dedicated channel in the uplink direction of other carrier frequency layers except the main carrier frequency layer in multi-carrier. The first RNC establishes the enhanced dedicated channel cell over the non-main carrier frequency layer in the node B via an IUB interface and/or in the second RNC via an IUR interface.

In the above, the step of the first RNC configuring the enhanced dedicated channel transmission bearer mode of the predetermined network element comprises the step as follows: the first RNC configures the enhanced dedicated channel transmission bearer mode of the predetermined network element as a share mode or a separate mode. Under the share mode, the first RNC can distinguish the transmission data of a main carrier and the transmission data of an auxiliary carrier according to the uplink multiplexing information, and under the separate mode, the first RNC can distinguish the transmission data of the main carrier and the transmission data of the auxiliary carrier according to different transmission bearers.

Figure 1:
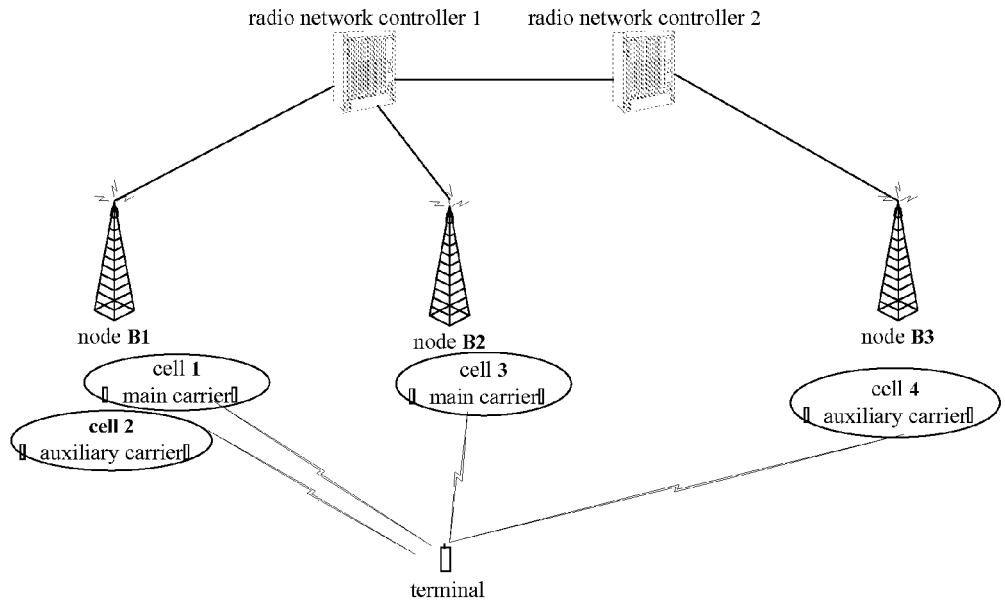
FIG. 1 is a schematic diagram of a scenario of a dual carrier high speed uplink packet access according to the related art.
Figure 2:
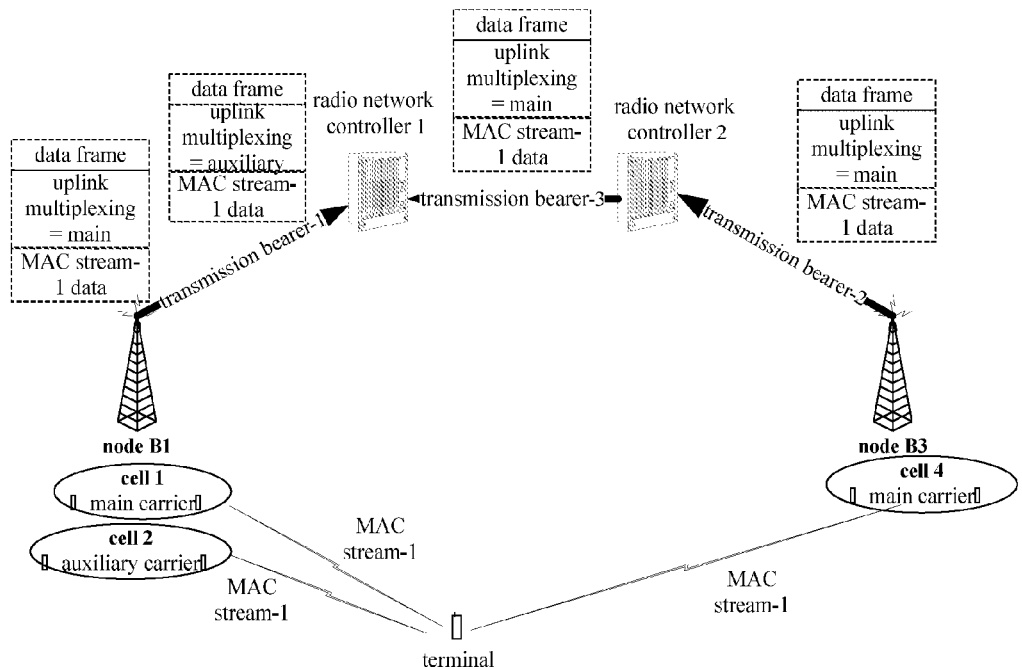
FIG. 2 is a schematic diagram of an uplink enhanced dedicated channel data frame transmission of "share mode" according to the related art.
Figure 3:
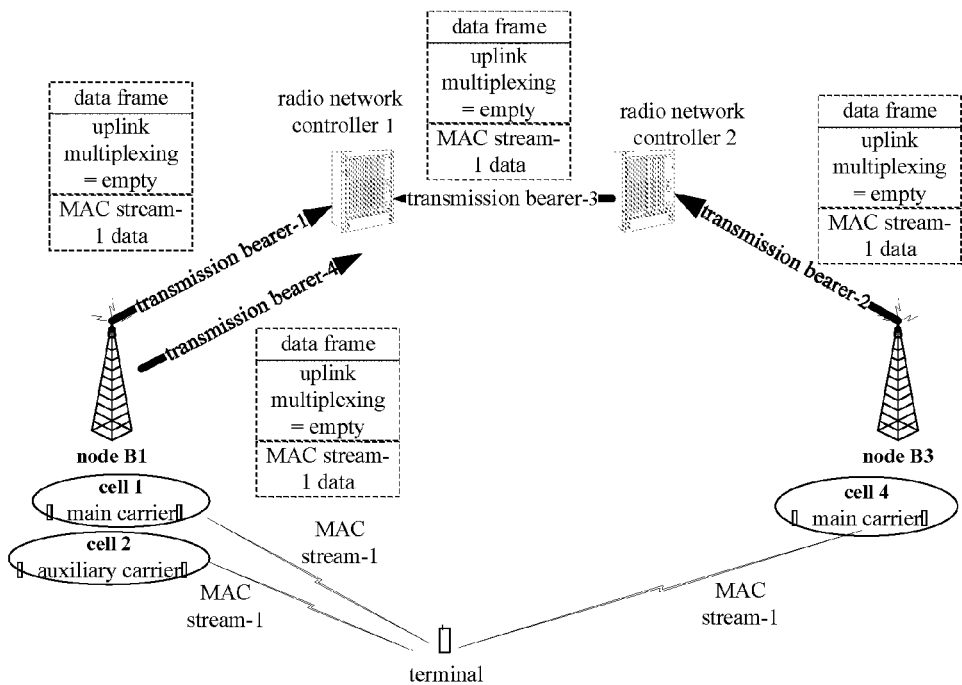
FIG. 3 is a schematic diagram of an uplink enhanced dedicated channel data frame transmission of "separate mode" according to the related art.
Figure 4:
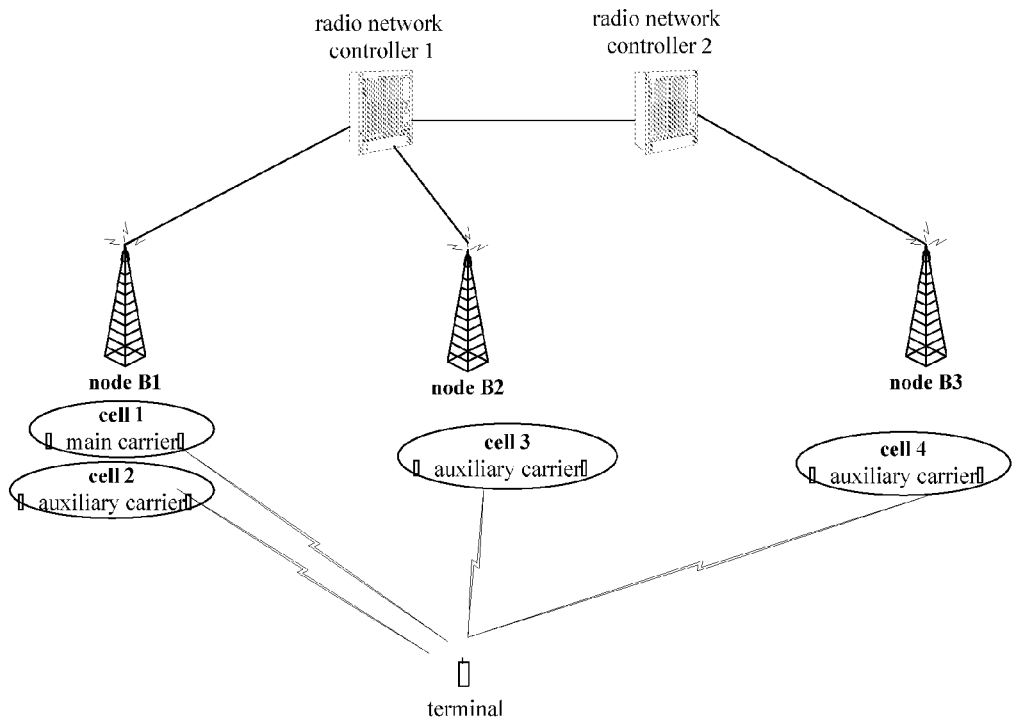
FIG. 4 is a schematic diagram of another scenario of a dual carrier high speed uplink packet access according to the related art.
Figure 5:
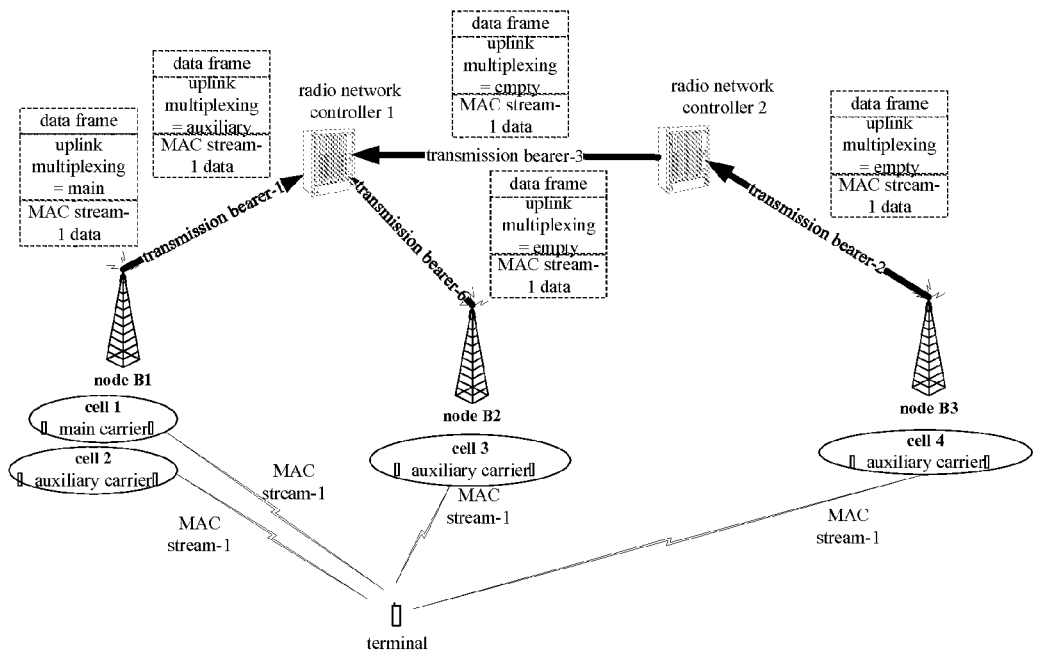
FIG. 5 is a schematic diagram of an uplink enhanced dedicated channel data frame transmission according to the scenario shown in FIG. 4.
Figure 6:
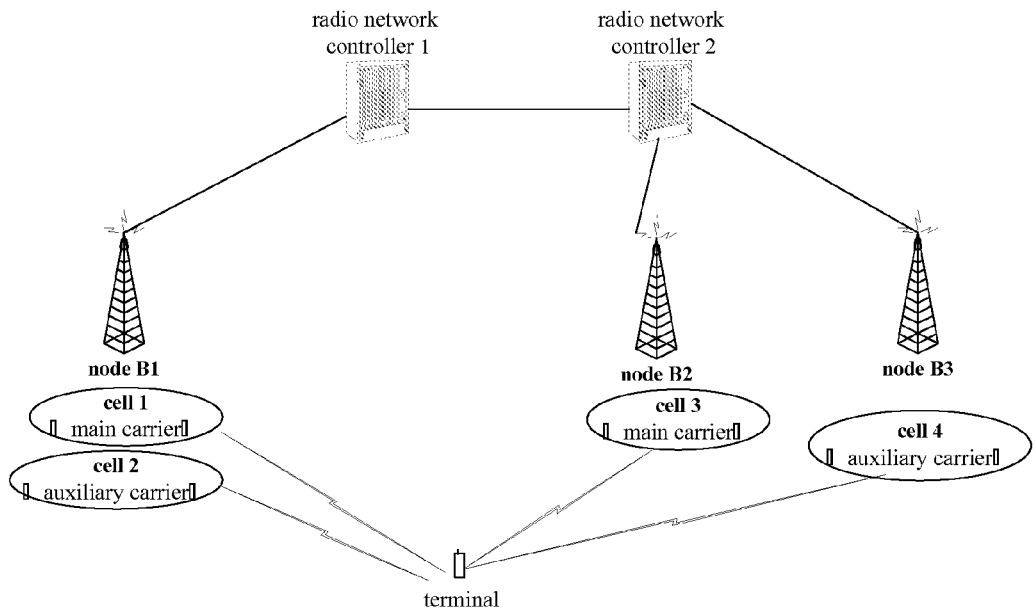
FIG. 6 is a schematic diagram of another scenario of a dual carrier high speed uplink packet access according to the related art.
Figure 7:
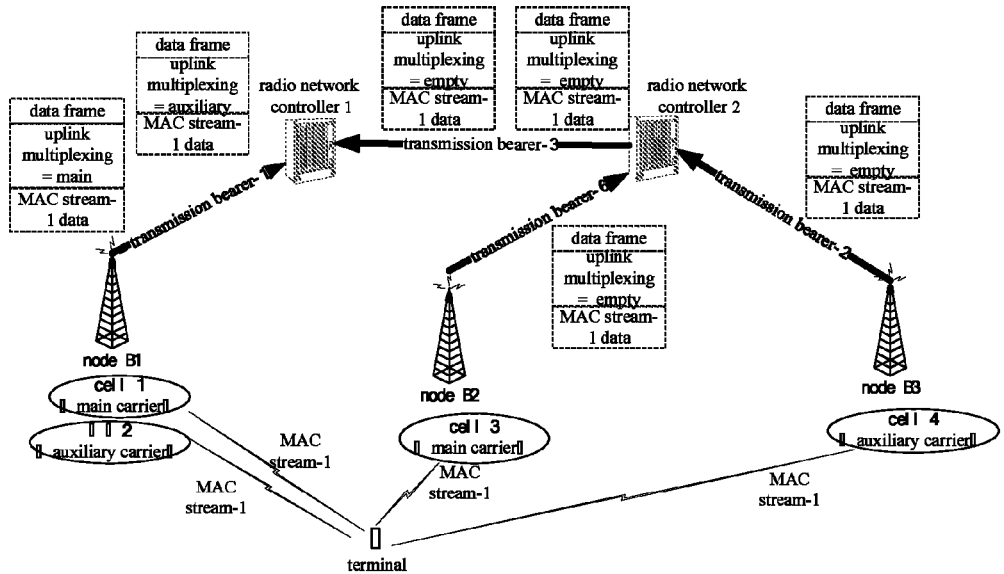
FIG. 7 is a schematic diagram of an uplink enhanced dedicated channel data frame transmission according to the scenario shown in FIG. 6.

In particular, the situation of the first RNC establishing the enhanced dedicated channel cell over the non-main carrier frequency layer in the predetermined network element comprises a first situation and a second situation, wherein the first situation is that before the first RNC establishes the enhanced dedicated channel cell over the non-main carrier frequency layer in the predetermined network element, the first RNC has never established an enhanced dedicated channel cell over the main carrier frequency layer in the predetermined network element, that is to say, at this moment there is only a auxiliary carrier enhanced dedicated channel cell established in the predetermined network element; and the second situation is that before the first RNC establishes the enhanced dedicated channel cell over the non-main carrier frequency layer in the predetermined network element, the first RNC has established an enhanced dedicated channel cell over the main carrier frequency layer in the predetermined network element. That is to say, at this moment, not only a main carrier enhanced dedicated channel cell but also an auxiliary carrier enhanced dedicated channel cell are established in the predetermined network element, such as the node B1 in FIG. 1.

When the process of the first RNC establishing the enhanced dedicated channel cell over the non-main carrier frequency layer in the predetermined network element in step S802 is in the first situation, after the step 802, the method comprises a step S804.

Step S804: the predetermined network element transmits an enhanced dedicated channel data frame on the enhanced dedicated channel cell over the non-main carrier frequency layer according to the configuration of the enhanced dedicated channel transmission bearer mode. That is, the node B and/or the second RNC transmits the enhanced dedicated channel data frame on the enhanced dedicated channel cell over each frequency layer of non-main carriers managed by the node B and/or the second RNC by using the set enhanced dedicated channel transmission bearer mode information.

When the process of the first RNC establishing the enhanced dedicated channel cell over the non-main carrier frequency layer in the predetermined network element in step S802 is in the second situation, after step 802, the method comprises a step S806.

Step S806: the predetermined network element transmits the enhanced dedicated channel data frame on the enhanced dedicated channel cell over each frequency layer comprising the main carrier therein according to the configuration of the enhanced dedicated channel transmission bearer mode. That is, the node B and/or the second RNC transmits the enhanced dedicated channel data frame on the enhanced dedicated channel cell over each frequency layer comprising the main carrier therein managed by the node B and/or the second RNC by using the set enhanced dedicated channel transmission bearer mode information.

In the above steps S804 and S806, the particular way of transmitting the enhanced dedicated channel data frame is: when the transmission bearer mode of the enhanced dedicated channel uses the "share mode", the same MAC stream received on all the uplink carriers in the multi-carrier is selected and sent over one transmission bearer; and when the transmission bearer mode of the enhanced dedicated channel uses the "separate mode", each MAC stream received on each different uplink carrier in the multi-carrier is selected and sent over one transmission bearer.

In the above steps S804 and S806, the predetermined network element transmitting the enhanced dedicated channel data frame according to the configuration of the enhanced dedicated channel transmission bearer mode comprises the step of: the predetermined network element setting the uplink multiplexing information in the enhanced dedicated channel data frame according to the configuration of the enhanced dedicated channel transmission bearer mode and transmitting the enhanced dedicated channel data frame. In the above, setting the uplink multiplexing information in the enhanced dedicated channel data frame according to the configuration of the enhanced dedicated channel transmission bearer mode refers to: when the transmission bearer mode of the enhanced dedicated channel uses the "separate mode", setting the uplink multiplexing information in the enhanced dedicated channel data frame as empty or the uplink multiplexing information in the enhanced dedicated channel data frame being neglected by a receiver; and when transmission bearer mode of the enhanced dedicated channel uses the "share mode", setting the uplink multiplexing information in the enhanced dedicated channel data frame as the identifier of the carrier from which this data frame is received. As to a dual carrier, the carrier identifier can be main carrier or auxiliary carrier; as to a three-carrier, the carrier identifier can be main carrier or second carrier or third carrier; as to a four-carrier, the carrier identifier can be main carrier or second carrier or third carrier or fourth carrier; and so forth.

In the above, the enhanced dedicated channel data frame is an uplink enhanced dedicated channel data frame of Type 2, i.e. the data frame type used for multi-carrier technology.

It needs to be noted that as a preferred solution, if the first RNC only establishes or adds an enhanced dedicated channel cell over the main carrier frequency layer in the predetermined network element and in the situation that the first RNC has never established an enhanced dedicated channel cell on a non-main carrier frequency layer in the predetermined network element (i.e., at this moment there is only a main carrier enhanced dedicated channel cell established in the predetermined network element), the first RNC does not configure the enhanced dedicated channel transmission bearer mode of the predetermined network element. The subsequent predetermined network elements use the existing single carrier processing mode to select the same MAC stream and send the same MAC stream on one transmission bearer, the uplink multiplexing information in the uplink enhanced dedicated channel data frame is set as empty, or the uplink multiplexing information in the uplink enhanced dedicated channel data frame is neglected by the receiver, and the uplink enhanced dedicated channel data frame is transmitted to the first radio network controller. Since in the situation that only a main carrier enhanced dedicated channel cell is established in the predetermined network element, even if the first RNC wrongly understands the meaning of "empty" of the uplink multiplexing information and also "mistakenly" obtains the correct result, Therefore, the enhanced dedicated channel transmission bearer mode is not configured in the situation that only a main carrier enhanced dedicated channel cell is established in the predetermined network element, which can reduce the operation of the system as much as possible and save system resources.

Preferably, establishing the enhanced dedicated channel cell over the non-main carrier frequency layer comprises at least one of the following: establishing the enhanced dedicated channel cell over the non-main carrier frequency layer via a wireless link establishment process and establishing the enhanced dedicated channel cell over the non-main carrier frequency layer via a wireless link addition process. A "wireless link establishment request" signaling is used during the wireless link establishment process. A "wireless link addition request" signaling is used during the wireless link addition process.

Hereinafter, the application process of the above method for configuring the enhanced dedicated channel transmission bearer mode will be described in detail by way of particular embodiments.

Embodiment II

Figure 9:
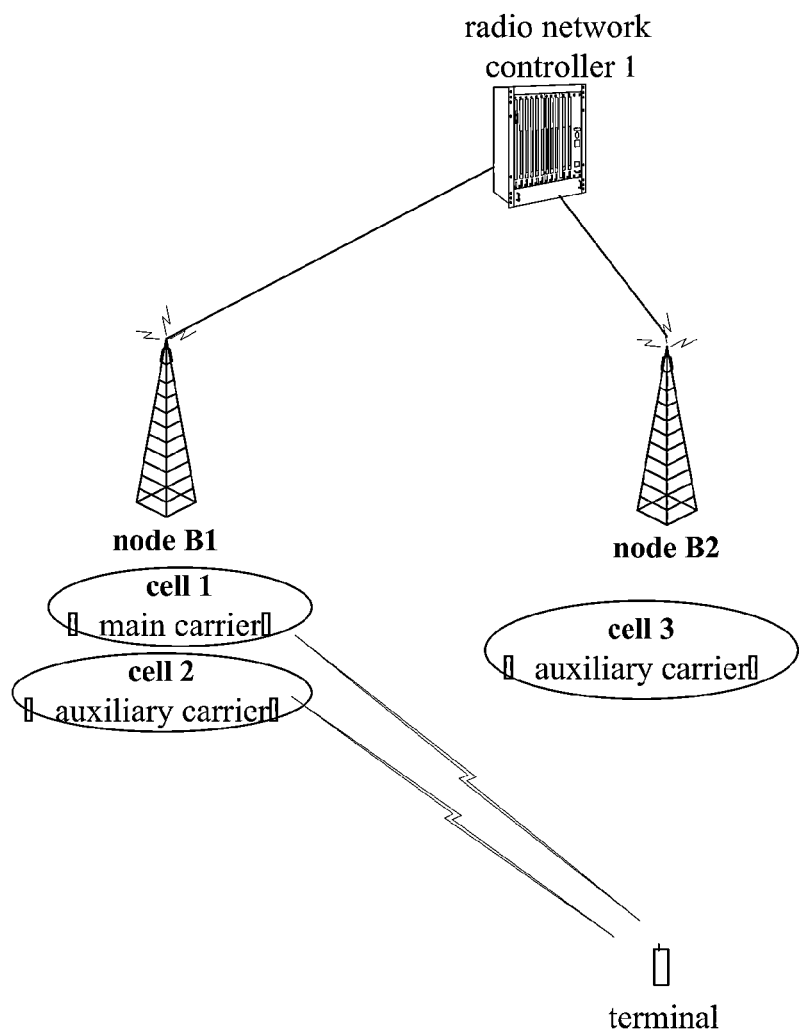
FIG. 9 is a schematic diagram of an exemplary scenario according to Embodiment II of the present invention.

The application scenario in this embodiment is as shown in FIG. 9, in which a terminal only uses the dual carrier high speed uplink packet access technology in a cell 1 (main carrier) and a cell 2 (auxiliary carrier) under a node B1. A radio network controller 1 will establish an enhanced dedicated channel cell over a non-main carrier frequency layer: a cell 3 under a node B2 (auxiliary carrier).

Figure 10:
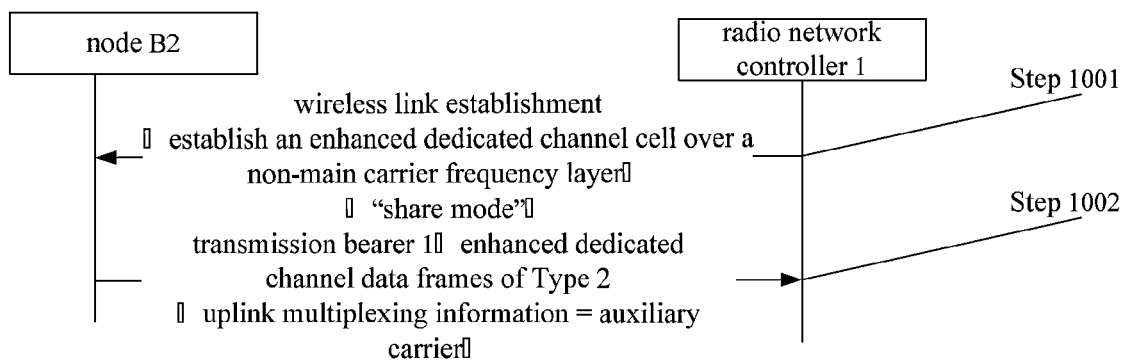
FIG. 10 is a flowchart of a processing procedure according to Embodiment II of the present invention.

As shown in FIG. 10, a method for configuring an enhanced dedicated channel transmission bearer mode based on the above scenario comprises the steps as follows.

Step 1001: as to those designated terminals which use the dual carrier high speed uplink packet access technology, the radio network controller 1 establishes the enhanced dedicated channel cell over the non-main carrier frequency layer in the cell 3 under the node B2 via an IUB interface. The radio network controller 1 sends a "wireless link establishment request" to the node B2 during the wireless link establishment process, and configures enhanced dedicated channel transmission bearer mode information as "share mode" in this signaling. It needs to be noted that the radio network controller 1 can also configure the enhanced dedicated channel transmission bearer mode by other ways but not limited to carrying the configuration information in the wireless link establishment/addition request.

Step 1002: the node B2 transmits enhanced dedicated channel data frames on the enhanced dedicated channel cell (that is, the cell 3 (there is only one cell under this scenario)) over each frequency layer of non-main carriers managed by the node B2 by using the set enhanced dedicated channel transmission bearer mode information. The node B2 selects the same MAC stream received on all the uplink carriers in the dual carrier and sends the same MAC stream on one transmission bearer according to the "share mode", i.e., sends the same MAC stream on a transmission bearer 1. The node B2 sets the uplink multiplexing information in the uplink enhanced dedicated channel data frames as the identifier of the carrier from which these data frames are received according to the "share mode", that is auxiliary carrier. The node B2 uses the enhanced dedicated channel data frames of Type 2 for transmission.

Embodiment III

Figure 11:
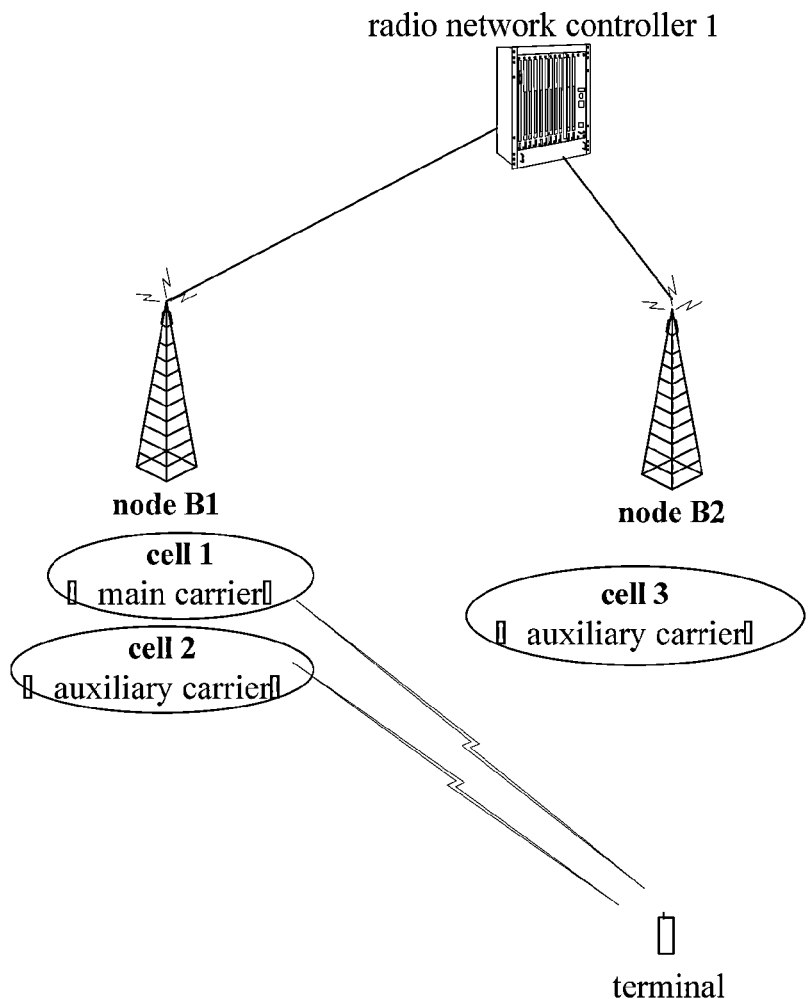
FIG. 11 is a schematic diagram of an exemplary scenario according to Embodiment III of the present invention.

The application scenario in this embodiment is as shown in FIG. 11, in which a terminal only uses the dual carrier high speed uplink packet access technology in a cell 1 (main carrier) and a cell 2 (auxiliary carrier) under a node B1. A radio network controller 1 will establish an enhanced dedicated channel cell over a non-main carrier frequency layer: a cell 3 under a node B2 (auxiliary carrier).

Figure 12:
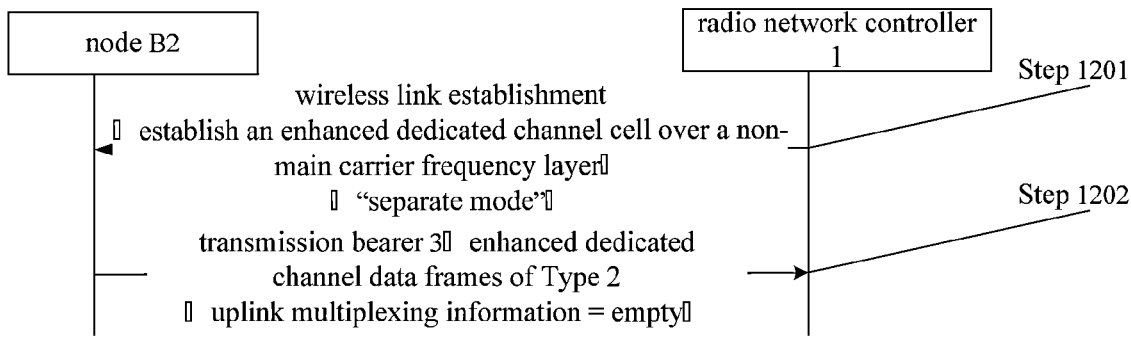
FIG. 12 is a flowchart of a processing procedure according to Embodiment III of the present invention.

As shown in FIG. 12, a method for configuring an enhanced dedicated channel transmission bearer mode based on the above scenario comprises the steps as follows.

Step 1201: as to those designated terminals which use the dual carrier high speed uplink packet access technology, the radio network controller 1 establishes the enhanced dedicated channel cell over the non-main carrier frequency layer in the cell 3 under the node B2 via an IUB interface. The radio network controller 1 sends a "wireless link establishment request" to the node B2 during the wireless link establishment process, and configures enhanced dedicated channel transmission bearer mode information as "separate mode" in this signaling. It needs to be noted that the radio network controller 1 can also configure the enhanced dedicated channel transmission bearer mode by other ways but not limited to carrying the configuration information in the wireless link establishment/addition request.

Step 1202: the node B2 transmits enhanced dedicated channel data frames on the enhanced dedicated channel cell (that is, the cell 3 (there is only one cell under this scenario)) over each frequency layer of non-main carriers managed by the node B2 by using the set enhanced dedicated channel transmission bearer mode information. The node B2 selects each MAC stream received on each different uplink carrier in the multi-carrier and sends the each MAC stream on one transmission bearer according to the "separate mode", i.e., sends the same MAC stream on a transmission bearer 3 corresponding to an auxiliary carrier. The node B2 sets the uplink multiplexing information in the uplink enhanced dedicated channel data frames as empty according to the "separate mode" or the uplink multiplexing information in the uplink enhanced dedicated channel data frames is neglected by a receiver. The node B2 uses the enhanced dedicated channel data frames of Type 2 for transmission.

Embodiment VI

Figure 13:
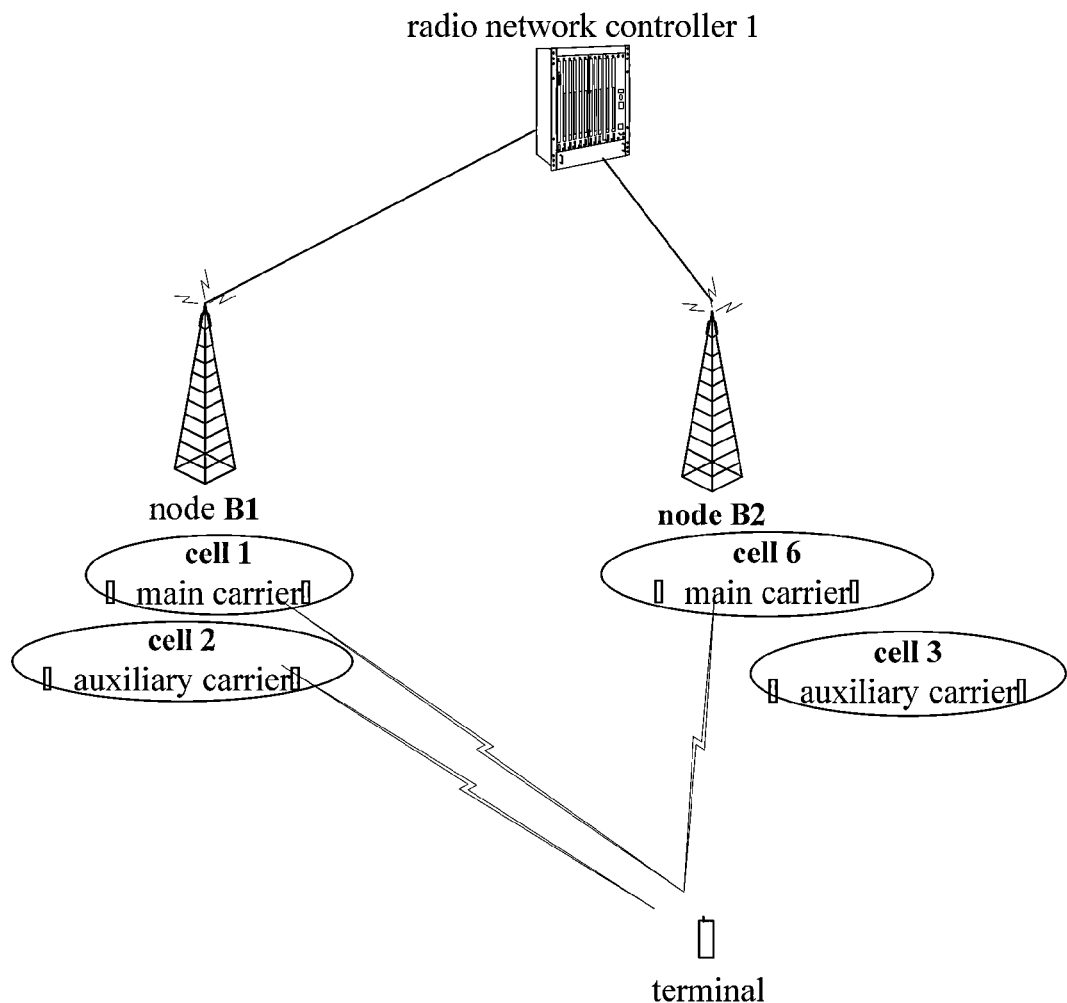
FIG. 13 is a schematic diagram of an exemplary scenario according to Embodiment IV of the present invention.

The application scenario in this embodiment is as shown in FIG. 13, in which a terminal only uses the dual carrier high speed uplink packet access technology in a cell 1 (main carrier) and a cell 2 (auxiliary carrier) under a node B1 and a cell 6 (main carrier) under a node B2. A radio network controller 1 will establish an enhanced dedicated channel cell over a non-main carrier frequency layer: a cell 3 under a node B2 (auxiliary carrier). Currently, since in the node B2 the radio network controller 1 has never established any enhanced dedicated channel cell over the non-main carrier frequency layer under the node B2, enhanced dedicated channel transmission bearer mode information is not set.

Figure 14:
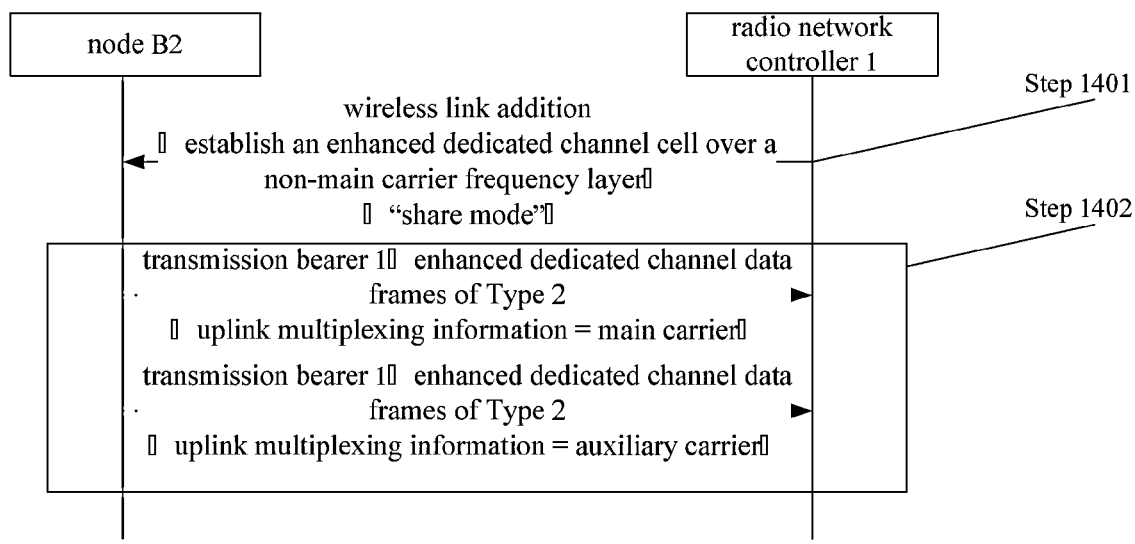
FIG. 14 is a flowchart of a processing procedure according to Embodiment IV of the present invention.

As shown in FIG. 14, a method for configuring an enhanced dedicated channel transmission bearer mode based on the above scenario comprises the steps as follows.

Step 1401: as to those designated terminals which use the dual carrier high speed uplink packet access technology, the radio network controller 1 establishes the enhanced dedicated channel cell over the non-main carrier frequency layer in the cell 3 under the node B2 via an IUB interface. The radio network controller 1 sends a "wireless link addition request" to the node B2 during the wireless link addition process, and configures enhanced dedicated channel transmission bearer mode information as "share mode" in this signaling. It needs to be noted that the radio network controller 1 can also configure the enhanced dedicated channel transmission bearer mode by other ways but not limited to carrying the configuration information in the wireless link establishment/addition request.

Step 1402: the node B2 transmits enhanced dedicated channel data frames on the enhanced dedicated channel cell (that is, the cell 6 (main carrier) and the cell 3 (auxiliary carrier)) over each frequency layer of non-main carriers managed by the node B2 by using the set enhanced dedicated channel transmission bearer mode information. The node B2 selects the same MAC stream received on all the uplink carriers in the dual carrier and sends the same MAC stream on one transmission bearer according to the "share mode", i.e., sends the same MAC stream on a transmission bearer 1. The node B2 sets the uplink multiplexing information in the uplink enhanced dedicated channel data frames as the identifier of the carrier from which these data frames are received according to the "share mode", wherein the received data from the main carrier are set as main carrier and the received data from the auxiliary carrier are set as auxiliary carrier. The node B2 uses the enhanced dedicated channel data frames of Type 2 for transmission.

Embodiment V

Figure 15:
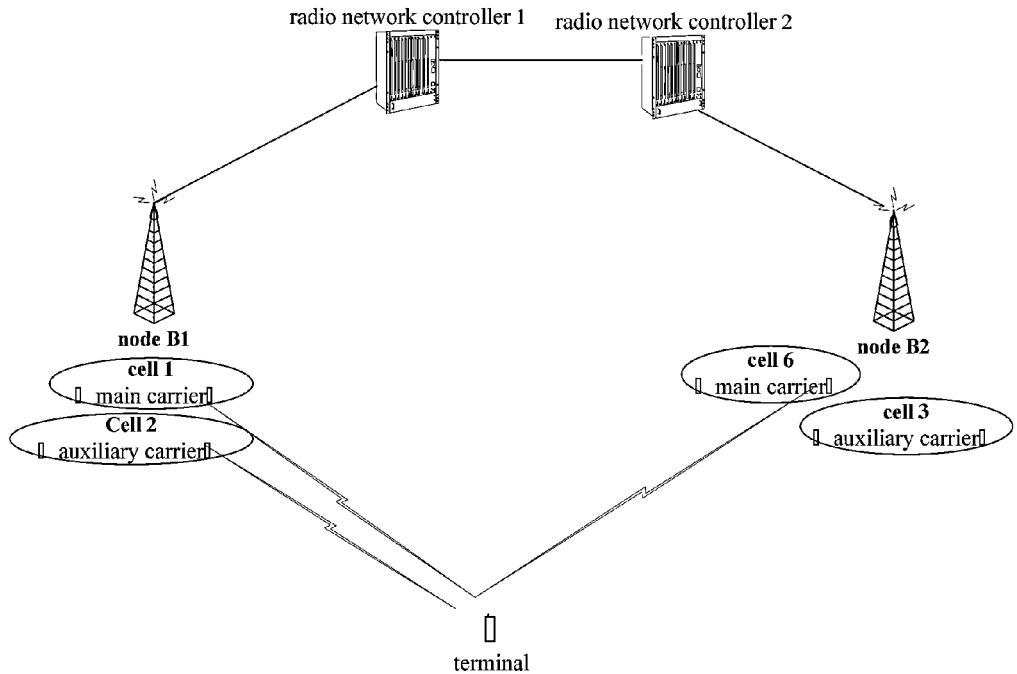
FIG. 15 is a schematic diagram of an exemplary scenario according to Embodiment V of the present invention.

The application scenario in this embodiment is as shown in FIG. 15, in which a terminal currently uses the dual carrier high speed uplink packet access technology under a cell 1 (main carrier) and a cell 2 (auxiliary carrier) under a node B1 and a cell 6 (main carrier) under a node B2 which belongs to a radio network controller 2. A radio network controller 1 will establish an enhanced dedicated channel cell over a non-main carrier frequency layer in the radio network controller 2: a cell 3 (auxiliary carrier) under a node B2 which belongs to the radio network controller 2. Currently, since in the radio network controller 2 the radio network controller 1 has never established any enhanced dedicated channel cell over the non-main carrier frequency layer under the radio network controller 2, enhanced dedicated channel transmission bearer mode information is not set.

Figure 16:
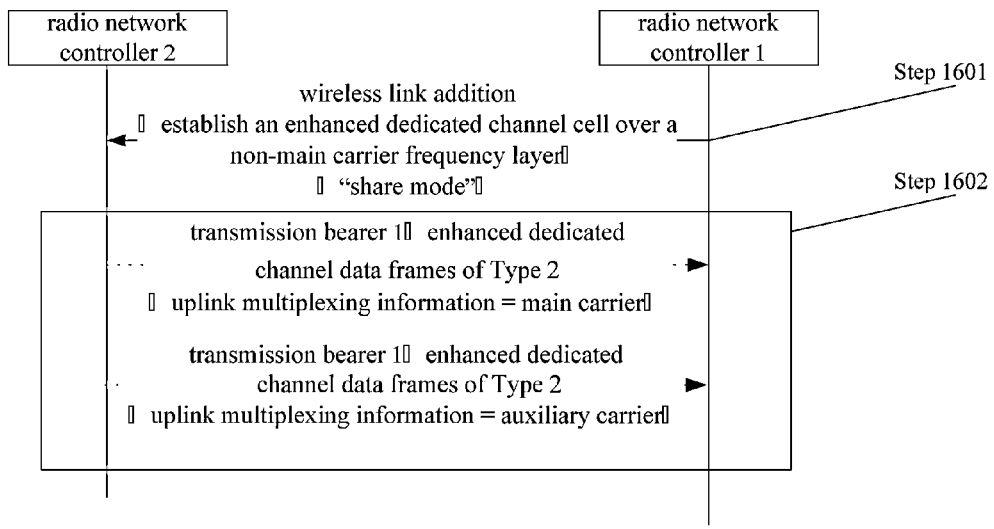
FIG. 16 is a flowchart of a processing procedure according to Embodiment V of the present invention.

As shown in FIG. 16, a method for configuring an enhanced dedicated channel transmission bearer mode based on the above scenario comprises the steps as follows.

Step 1601: as to those designated terminals which use the dual carrier high speed uplink packet access technology, the radio network controller 1 establishes the enhanced dedicated channel cell over the non-main carrier frequency layer in the cell 3 under the node B2 which belongs to the radio network controller 2 via an IUB interface. The radio network controller 1 sends a "wireless link addition request" to the radio network controller 2 during the wireless link addition process, and configures enhanced dedicated channel transmission bearer mode information as "share mode" in this signaling. It needs to be noted that the radio network controller 1 can also configure the enhanced dedicated channel transmission bearer mode by other ways but not limited to carry the configuration information in the wireless link establishment/addition request.

Step 1602: the radio network controller 2 transmits enhanced dedicated channel data frames on the enhanced dedicated channel cell (that is, the cell 6 (main carrier) and the cell 3 (auxiliary carrier)) over each frequency layer of non-main carriers managed by the radio network controller 2 by using the set enhanced dedicated channel transmission bearer mode information. The radio network controller 2 selects the same MAC stream received on all the uplink carriers in the dual carrier and sends the same MAC stream on one transmission bearer, that is, sends the same MAC stream on a transmission bearer 1. The radio network controller 2 forwards the uplink enhanced dedicated channel data frames which are set by the node B2 according to the "share mode": the uplink multiplexing information of the received data from the main carrier is set as main carrier, and the uplink multiplexing information of the received data from the auxiliary carrier is set as auxiliary carrier. The radio network controller 2 uses the enhanced dedicated channel data frames of Type 2 for transmission.

The above Embodiments II to V are described by taking dual carrier for example, and the above method can be extended to multi-carrier, such as the situation of three-carrier and four-carrier, which will be described hereinafter by way of examples respectively.

Embodiment VI

Figure 17:
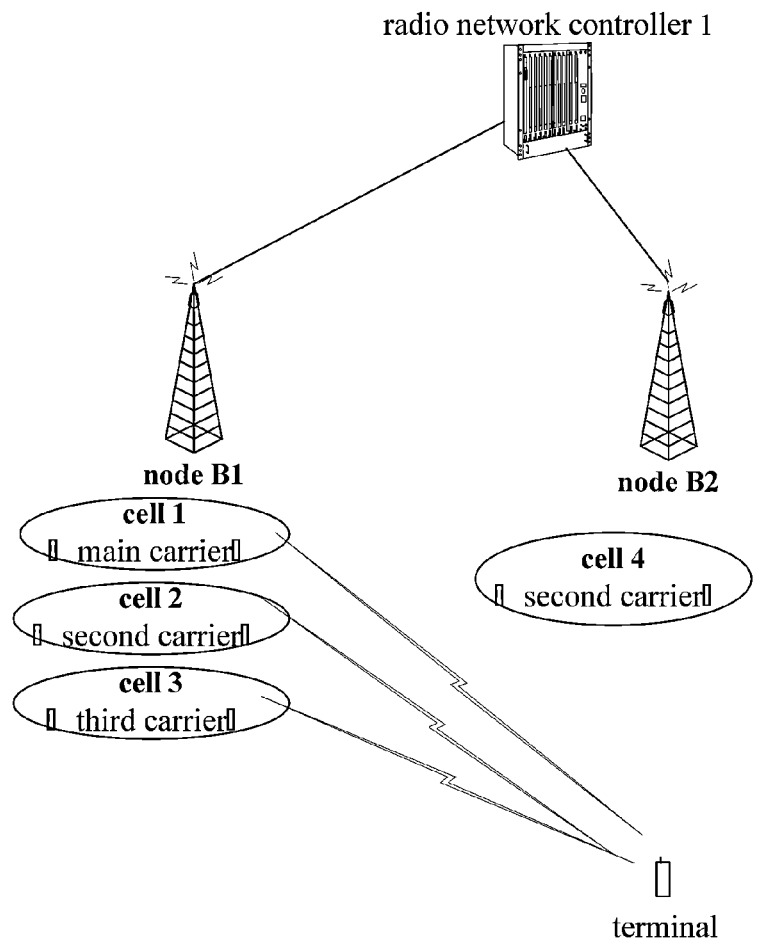
FIG. 17 is a schematic diagram of an exemplary scenario according to Embodiment VI of the present invention.

The application scenario in this embodiment is as shown in FIG. 17, in which a terminal only uses the three-carrier high speed uplink packet access technology in a cell 1 (main carrier) and a cell 2 (second carrier) under a node B1 and a cell 3 (third carrier). A radio network controller 1 will establish an enhanced dedicated channel cell over a non-main carrier frequency layer: a cell 4 under a node B2 (second carrier).

Figure 18:
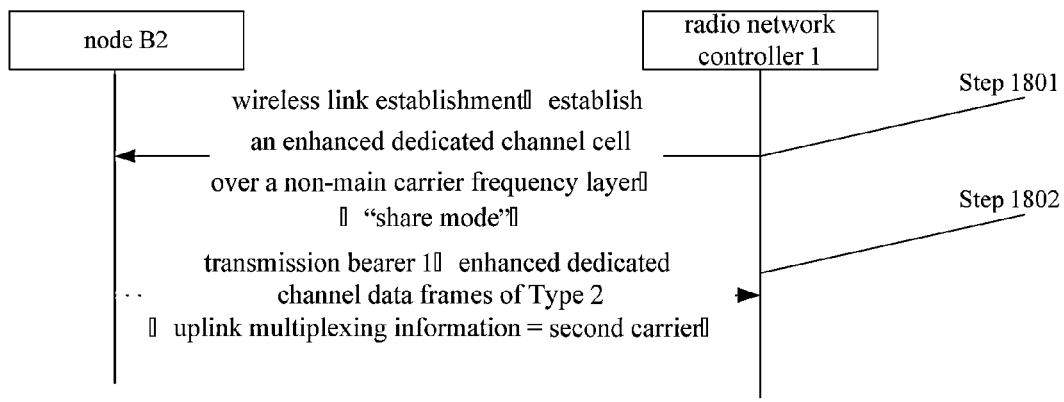
FIG. 18 is a flowchart of a processing procedure according to Embodiment VI of the present invention.

As shown in FIG. 18, a method for configuring an enhanced dedicated channel transmission bearer mode based on the above scenario comprises the steps as follows.

Step 1801: as to those designated terminals which use the three-carrier high speed uplink packet access technology, the radio network controller 1 establishes the enhanced dedicated channel cell over the non-main carrier frequency layer in the cell 4 under the node B2 via an IUB interface. The radio network controller 1 sends a "wireless link establishment request" to the node B2 during the wireless link establishment process, and configures enhanced dedicated channel transmission bearer mode information as "share mode" in this signaling. It needs to be noted that the radio network controller 1 can also configure the enhanced dedicated channel transmission bearer mode by other ways but not limited to carrying the configuration information in the wireless link establishment/addition request.

Step 1802: the node B2 transmits enhanced dedicated channel data frames on the enhanced dedicated channel cell (that is, the cell 4 (there is only one cell under this scenario)) over each frequency layer of non-main carriers managed by the node B2 by using the set enhanced dedicated channel transmission bearer mode information. The node B2 selects the same MAC stream received on all the uplink carriers in the three-carrier and sends the same MAC stream on one transmission bearer according to the "share mode", that is, sends the same MAC stream on a transmission bearer 1. The node B2 sets uplink multiplexing information in the uplink enhanced dedicated channel data frames as the identifier of the carrier from which these data frames are received according to the "share mode", that is second carrier. The node B2 uses the enhanced dedicated channel data frames of Type 2 for transmission.

Embodiment VII

Figure 19:
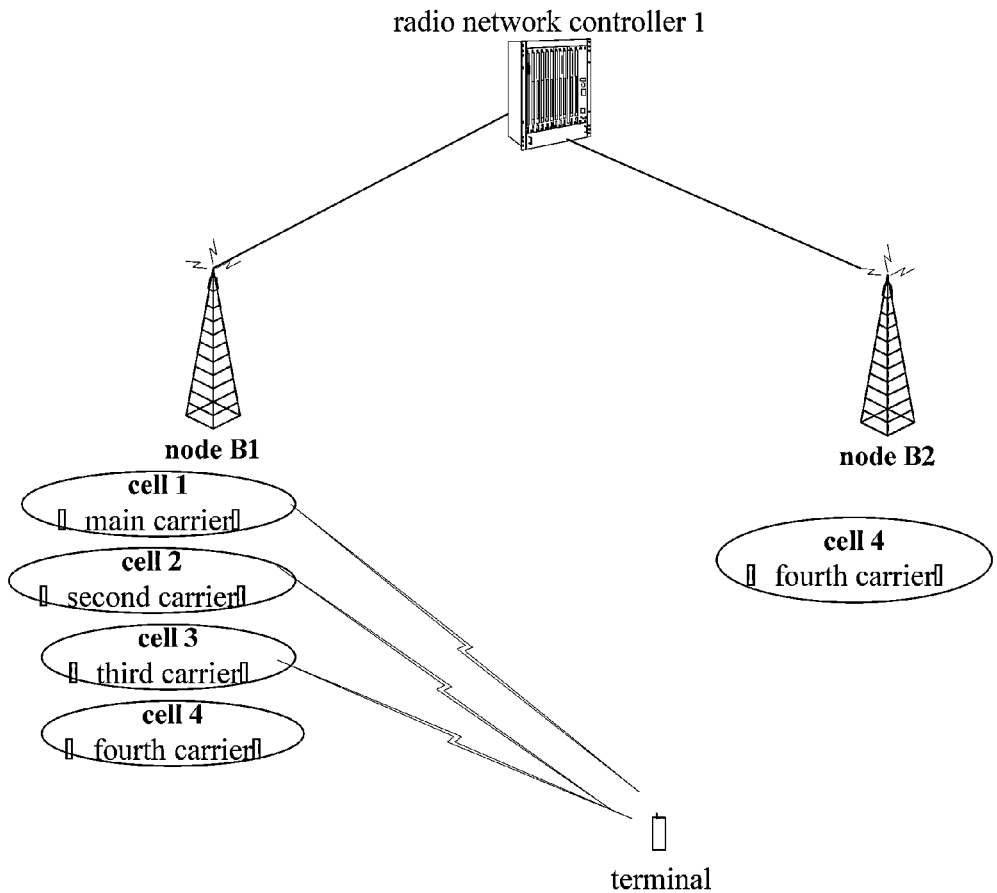
FIG. 19 is a schematic diagram of an exemplary scenario according to Embodiment VII of the present invention.

The application scenario in this embodiment is as shown in FIG. 19, in which a terminal only uses the four-carrier high speed uplink packet access technology in a cell 1 (main carrier), a cell 2 (second carrier), a cell 3 (third carrier), and a cell 4 (fourth carrier) under a node B1. A radio network controller 1 will establish an enhanced dedicated channel cell over a non-main carrier frequency layer: a cell 5 under a node B2 (fourth carrier).

Figure 20:
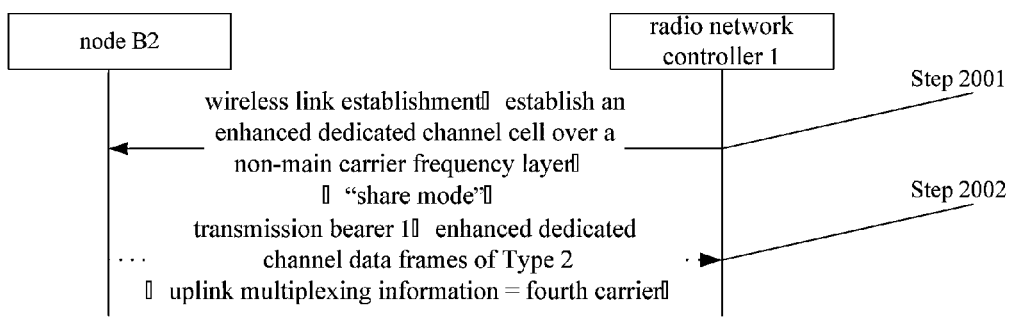
FIG. 20 is a flowchart of a processing procedure according to Embodiment VII of the present invention.

As shown in FIG. 20, a method for configuring an enhanced dedicated channel transmission bearer mode based on the above scenario comprises the steps as follows.

Step 2001: as to those designated terminals which use the four-carrier high speed uplink packet access technology, the radio network controller 1 establishes the enhanced dedicated channel cell over the non-main carrier frequency layer in the cell 5 under the node B2 via an IUB interface. The radio network controller 1 sends a "wireless link establishment request" to the node B2 during the wireless link establishment process, and configures enhanced dedicated channel transmission bearer mode information as "share mode" in this signaling. It needs to be noted that the radio network controller 1 can also configure the enhanced dedicated channel transmission bearer mode by other ways but not limited to carry the configuration information in the wireless link establishment/addition request.

Step 2002: the node B2 transmits enhanced dedicated channel data frames on the enhanced dedicated channel cell (that is, the cell 5 (there is only one cell under this scenario)) over each frequency layer of non-main carriers managed by the node B2 by using the set enhanced dedicated channel transmission bearer mode information. The node B2 selects the same MAC stream received on all the uplink carriers in the four-carrier and sends the same MAC stream on one transmission bearer according to the "share mode", that is, sends the same MAC stream on a transmission bearer 1. The node B2 sets uplink multiplexing information in the uplink enhanced dedicated channel data frames as the identifier of the carrier from which these data frames are received according to the "share mode", that is, fourth carrier. The node B2 uses the enhanced dedicated channel data frames of Type 2 for transmission.

It needs to be noted that, in the related art, the coded value corresponding to the main carrier in the "uplink multiplexing information" is generally set as 0, and if the coded value corresponding to the main carrier in the "uplink multiplexing information" is set as 1, the coded value corresponding to the auxiliary carrier is set as 0, while in the situation of single carrier transmission, the RNC will wrongly mistake transmitting data via the main carrier for transmitting data via the auxiliary carrier. The above method is also suitable, and it only needs to exchange the expression of "main carrier" and "auxiliary carrier".

Embodiment VIII

Figure 21:
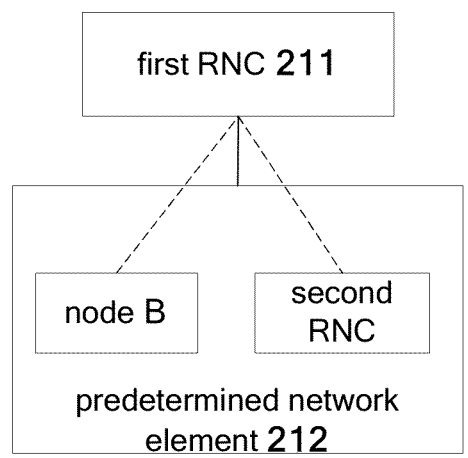
FIG. 21 is a structural block diagram of a system for configuring an enhanced dedicated channel transmission bearer mode according to Embodiment VIII of the present invention.

This embodiment provides a system for configuring an enhanced dedicated channel transmission bearer mode, and FIG. 21 is a structural block diagram of a system for configuring an enhanced dedicated channel transmission bearer mode according to Embodiment VIII of the present invention. As shown in FIG. 21, the system comprises: a first RNC 211 and a predetermined network element 212, wherein the first RNC 211 is configured to establish an enhanced dedicated channel cell over a non-main carrier frequency layer in the predetermined network element 212 and configure an enhanced dedicated channel transmission bearer mode of the predetermined network element 212, wherein the predetermined network element 212 comprises at least one of the following: a node B connected to the first RNC and a second RNC connected to the first RNC.

Preferably, the predetermined network element 212 is further configured to transmit an enhanced dedicated channel data frame according to configuration of the enhanced dedicated channel transmission bearer mode.

In summary, the solution for configuring the enhanced dedicated channel transmission bearer mode provided by the present invention solves the problem in the related art that a radio network controller cannot distinguish the received data from a main carrier and the received data from an auxiliary carrier and thus cannot normally carry out reordering and macro diversity combining, which causes the actual services unavailable and finally network dropping. The radio network controller of a convergence party is able to clearly distinguish the situations of received data from each carrier, the normal sending of actual service data of a terminal is ensured, and the availability of the dual carrier high speed uplink packet access technology is ensured.

Obviously, those skilled in the art should understand that the above modules or steps of the present invention can be implemented by using a general-purpose calculating apparatus, and they can be integrated on a single calculating apparatus or distributed over a network consisted of multiple calculating apparatus. Optionally, the modules and the steps of the present invention can be implemented by using the executable program code of the calculating device. Consequently, they can be stored in a storing device and executed by the calculating device, or they are made into integrated circuit module respectively, or a plurality of modules or steps thereof are made into one integrated circuit module. In this way, the present invention is not limited to any particular combination of hardware and software.

What are described above are only preferred embodiments of the present invention, which are not used to restrict the present invention. For those skilled in the art, the present invention can have various modifications and alternations. Any modifications, equivalent replacements, improvements, etc., within the spirit and principle of the present invention shall all fall into the protection scope of the present invention.

What is claimed is:

1. A method for configuring an enhanced dedicated channel transmission bearer mode, comprising:

in a situation that a first Radio Network Controller (RNC) establishes an enhanced dedicated channel cell over a non-main carrier frequency layer in a predetermined network element, the first RNC configuring the enhanced dedicated channel transmission bearer mode of the predetermined network element, wherein the predetermined network element comprises at least one of the following: a node B connected to the first RNC and a second RNC connected to the first RNC, wherein in the situation that the first RNC only establishes or adds an enhanced dedicated channel cell over a main carrier frequency layer in the predetermined network element and the first RNC has never established an enhanced dedicated channel cell over the non-main carrier frequency layer in the predetermined network element, the first RNC does not configure the enhanced dedicated channel transmission bearer mode of the predetermined network element.

2. The method according to claim 1, wherein the first RNC configuring the enhanced dedicated channel transmission bearer mode of the predetermined network element comprises: the first RNC configuring the enhanced dedicated channel transmission bearer mode of the predetermined network element as a share mode or a separate mode.

3. The method according to claim 2, wherein establishing the enhanced dedicated channel cell over the non-main carrier frequency layer comprises at least one of the following:

establishing the enhanced dedicated channel cell over the non-main carrier frequency layer via a wireless link establishment process and establishing the enhanced dedicated channel cell over the non-main carrier frequency layer via a wireless link addition process.

4. The method according to claim 1, wherein the situation that the first RNC establishes the enhanced dedicated channel cell over the non-main carrier frequency layer in the predetermined network element comprises at least one of a first situation and a second situation, wherein the first situation is that before the first RNC establishes the enhanced dedicated channel cell over the non-main carrier frequency layer in the predetermined network element, the first RNC has never established an enhanced dedicated channel cell over a main carrier frequency layer in the predetermined network element; and the second situation is that before the first RNC establishes the enhanced dedicated channel cell over the non-main carrier frequency layer in the predetermined network element, the first RNC has ever established an enhanced dedicated channel cell over the main carrier frequency layer in the predetermined network element.

5. The method according to claim 4, wherein, after the first RNC configures the enhanced dedicated channel transmission bearer mode of the predetermined network element, the method further comprises:

in the first situation, the predetermined network element transmitting an enhanced dedicated channel data frame on the enhanced dedicated channel cell over the non-main carrier frequency layer according to configuration of the enhanced dedicated channel transmission bearer mode; and in the second situation, the predetermined network element transmitting the enhanced dedicated channel data frame on the enhanced dedicated channel cell over each frequency layer comprising a main carrier according to the configuration of the enhanced dedicated channel transmission bearer mode.

6. The method according to claim 5, wherein the predetermined network element transmitting the enhanced dedicated channel data frame according to the configuration of the enhanced dedicated channel transmission bearer mode comprises:

the predetermined network element setting uplink multiplexing information in the enhanced dedicated channel data frame according to the configuration of the enhanced dedicated channel transmission bearer mode and transmitting the enhanced dedicated channel data frame.

7. The method according to claim 6, wherein the enhanced dedicated channel data frame is an uplink enhanced dedicated channel data frame of Type 2.

8. The method according to claim 6, wherein establishing the enhanced dedicated channel cell over the non-main carrier frequency layer comprises at least one of the following:

establishing the enhanced dedicated channel cell over the non-main carrier frequency layer via a wireless link establishment process and establishing the enhanced dedicated channel cell over the non-main carrier frequency layer via a wireless link addition process.

9. The method according to claim 5, wherein the enhanced dedicated channel data frame is an uplink enhanced dedicated channel data frame of Type 2.

10. The method according to claim 5, wherein establishing the enhanced dedicated channel cell over the non-main carrier frequency layer comprises at least one of the following:

establishing the enhanced dedicated channel cell over the non-main carrier frequency layer via a wireless link establishment process and establishing the enhanced dedicated channel cell over the non-main carrier frequency layer via a wireless link addition process.

11. The method according to claim 4, wherein establishing the enhanced dedicated channel cell over the non-main carrier frequency layer comprises at least one of the following:

establishing the enhanced dedicated channel cell over the non-main carrier frequency layer via a wireless link establishment process and establishing the enhanced dedicated channel cell over the non-main carrier frequency layer via a wireless link addition process.

12. The method according to claim 1, wherein establishing the enhanced dedicated channel cell over the non-main carrier frequency layer comprises at least one of the following:

establishing the enhanced dedicated channel cell over the non-main carrier frequency layer via a wireless link establishment process and establishing the enhanced dedicated channel cell over the non-main carrier frequency layer via a wireless link addition process.

13. A system for configuring an enhanced dedicated channel transmission bearer mode, comprising:

a first RNC and a predetermined network element, wherein the first RNC is configured to establish an enhanced dedicated channel cell over a non-main carrier frequency layer in the predetermined network element and configure the enhanced dedicated channel transmission bearer mode of the predetermined network element, wherein the predetermined network element comprises at least one of the following: a node B connected to the first RNC and a second RNC connected to the first RNC, wherein in the situation that the first RNC only establishes or adds an enhanced dedicated channel cell over a main carrier frequency layer in the predetermined network element and the first RNC has never established an enhanced dedicated channel cell over the non-main carrier frequency layer in the predetermined network element, the first RNC does not configure the enhanced dedicated channel transmission bearer mode of the predetermined network element.

14. The system according to claim 13, wherein the predetermined network element is further configured to transmit an enhanced dedicated channel data frame according to configuration of the enhanced dedicated channel transmission bearer mode.

* * * * *